United States Patent
Sinn et al.

(10) Patent No.: US 10,116,593 B1
(45) Date of Patent: Oct. 30, 2018

(54) TRANSMISSION AND STORAGE OF ROUTING PATH INFORMATION AND ROUTING TOPOLOGY INFORMATION USING A SINGLE ROUTING PROTOCOL

(71) Applicant: Amazon Technologies, Inc., Seattle, WA (US)

(72) Inventors: Frederick David Sinn, Seattle, WA (US); Leonard Thomas Tracy, Bothell, WA (US); Stephen Callaghan, Seattle, WA (US); Colin John Whittaker, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 105 days.

(21) Appl. No.: 15/274,985

(22) Filed: Sep. 23, 2016

(51) Int. Cl.
 *H04L 12/947* (2013.01)
 *H04L 12/741* (2013.01)
 *H04L 12/931* (2013.01)

(52) U.S. Cl.
 CPC .............. *H04L 49/25* (2013.01); *H04L 45/54* (2013.01); *H04L 49/70* (2013.01)

(58) Field of Classification Search
 CPC ................ H04L 12/66; H04L 29/0621; H04L 29/06224; H04L 65/013; H04L 65/102; H04L 65/1033; H04L 69/08; H04L 45/54; H04L 49/25; H04L 49/70; H04W 88/16; H04W 92/06
 See application file for complete search history.

(56) References Cited

U.S. PATENT DOCUMENTS

| | | | | |
|---|---|---|---|---|
| 9,660,897 | B1* | 5/2017 | Gredler | H04L 45/04 |
| 2006/0233181 | A1* | 10/2006 | Raszuk | H04L 45/02 370/401 |
| 2010/0166001 | A1* | 7/2010 | Uttaro | H04L 45/00 370/401 |
| 2011/0228785 | A1* | 9/2011 | Filsfils | H04L 45/02 370/395.31 |
| 2012/0069847 | A1* | 3/2012 | Saad | H04L 45/02 370/392 |
| 2015/0244628 | A1* | 8/2015 | Gredler | H04L 45/04 370/236 |
| 2015/0304206 | A1* | 10/2015 | Filsfils | H04L 45/04 709/238 |
| 2017/0026288 | A1* | 1/2017 | Yang | H04L 45/745 |

* cited by examiner

*Primary Examiner* — Benjamin H Elliott, IV
(74) *Attorney, Agent, or Firm* — Klarquist Sparkman, LLP

(57) ABSTRACT

Methods, systems, and devices are described for transmitting and storing routing path information and routing topology information using a single protocol. In particular embodiments, routing path information for an exterior gateway protocol ("EGP") network such as a border gateway protocol ("BGP") network is transmitted throughout an interior gateway protocol ("IGP") network using IGP messages such as open-shortest-path-first ("OSPF") or intermediate state to intermediates state ("IS-IS") messages. The IGP networks may transmit and store the BGP information using type length values (TLVs). As a result, network areas running an IGP may maintain BGP information throughout the network area without the overhead of an iBGP mesh and related message-passing.

20 Claims, 8 Drawing Sheets

TRANSMISSION AND STORAGE OF ROUTING PATH INFORMATION AND ROUTING TOPOLOGY INFORMATION USING A SINGLE ROUTING PROTOCOL

BACKGROUND

Generally described, communication networks transmit information from one location to another through routing devices. These routing devices employ routing protocols when transmitting data from one point to another. For example, a group of routing devices may use a common routing protocol to exchange routing information, such as the connectivity between different routing devices or the number of routing devices in a given routing path. The routing devices then use this routing information to determine what path should be used in transmitting data from one location to another, i.e., what routing devices should be used.

Routing protocols include interior gateway protocols or "IGPs" as well as exterior gateway protocols or "EGPs." IGPs include the Open Shortest Path First ("OSPF") and Intermediate System to Intermediate System ("IS-IS") protocols. One exemplary EGP is the Border Gateway Protocol ("BGP"). IGPs often are used to communicate within a grouping of routing devices, such as an autonomous system ("AS"). EGPs often are used to communicate between different groupings of routing devices, such as multiple different autonomous systems.

Transmission of data from one location to another may involve a number of different routing devices and a number of different routing protocols. For example, data may pass through several routing devices that communicate over a first OSPF network within a first AS and then through several other routing devices that communicate over a second OSPF network within a second AS. In this scenario, the first and second AS may communicate with each other over a BGP network. Such scenarios often are implemented inefficiently in that all routing devices run both the OSPF routing protocol and the BGP routing protocol in order to preserve the information necessary to determine an optimal routing path.

BGP messages are messages used to communicate BGP network information such as routing paths. BGP messages may specifically include information such as Path Attributes, Origin or Originator, AS_Path, Next_hop, multi-exit-disc or "MED," Local Preference or LOCAL-PREF, Aggregate, Aggregator, Community, Extended Community, and Cluster list. An exemplary message could be a BGP UPDATE message according to BGP-4, as specified in Internet Engineering Task Force RFC 4271.

DETAILED DESCRIPTION

Systems and methods for efficient network communications are described that allow routing devices to exchange both routing path information and routing topology information using a single protocol. Among other things, this allows networks to receive and propagate BGP network information without using a BGP network, which typically requires full-mesh connectivity between all routers and can lead to n-squared routing problems with an increasing number of network routers. One result is reduced overhead for a system in which BGP policy can be applied at a network point of origination within an IGP network.

Figure 1:
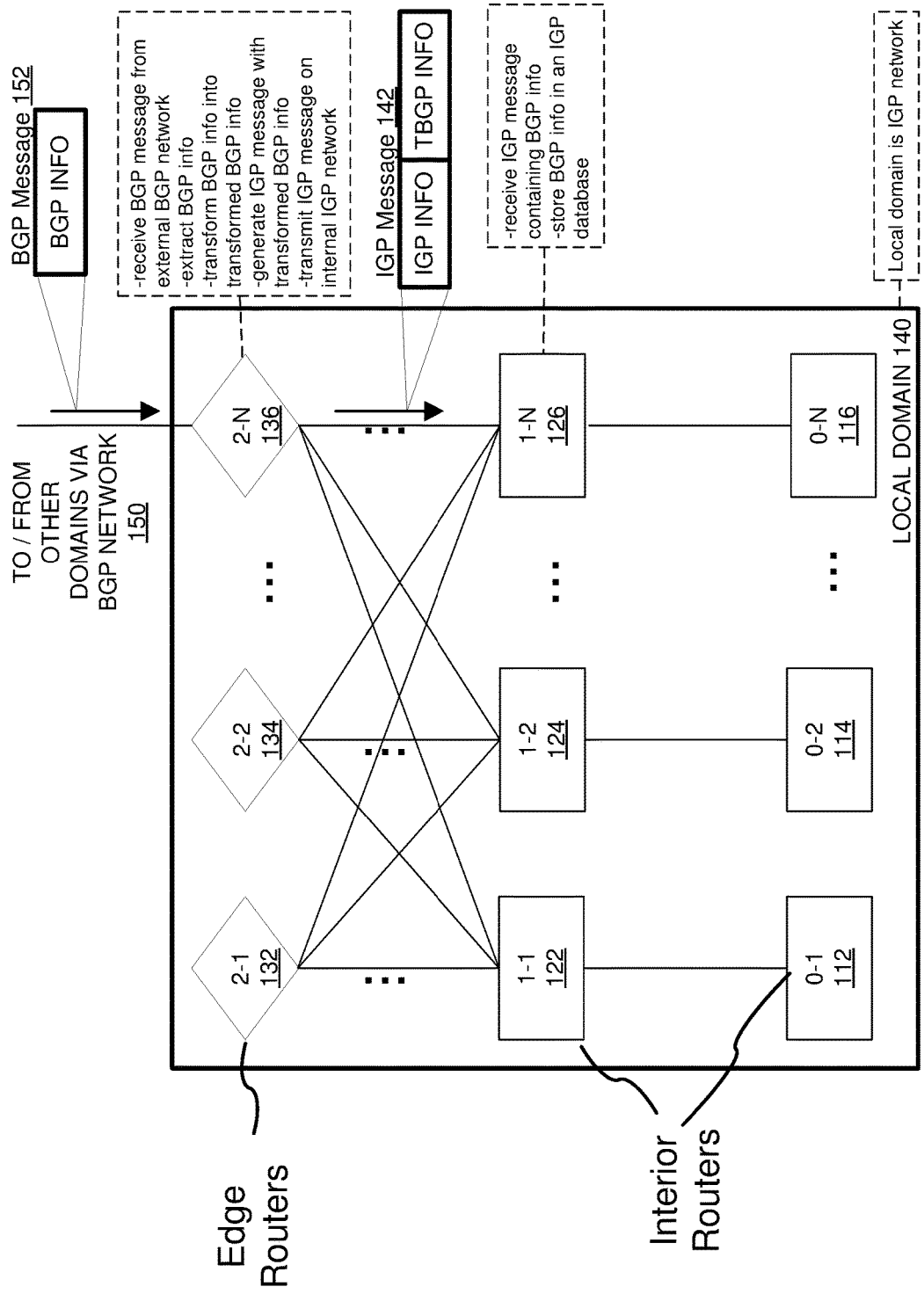
FIG. 1 is an example system diagram of a local domain in which edge routers and interior routers communicate both IGP information and BGP information using IGP messages.

FIG. 1 is an example system diagram of a local domain 140 in which edge routers 132, 134, 136 and interior routers 122, 124, 126, 112, 114, 116 may communicate both IGP information ("info") and BGP information using IGP messages. In this exemplary system, IGP can be run as the sole protocol within the local domain 140, including by edge routers 132, 134, 136. BGP may be spoken by edge routers 132, 134, 136 at the edges of the local domain 140 in order to communicate with external neighbors over a BGP network 150. Edge and interior routers may be hardware specifically designed and manufactured for network routing activities such as receiving, transmitting, and processing network packets or information. Alternatively, edge and interior routers may be more general-purpose computing devices that have been configured to carry out network routing activities, such as a computer with a networking card. Local domain 140 may be an autonomous system, a multi-tiered network within an autonomous system, or other types of grouped edge and interior routers.

FIG. 1 shows as an example that BGP info initially is received in the local domain at edge router 2-N 136 through a BGP message 152. Edge router 2-N 136 performs further processing of BGP message 152, such as extracting the BGP information, transforming the BGP information into transformed BGP information, and generating an IGP message that contains the transformed BGP information, e.g., NLRI and other routing path information for BGP network 150. In an embodiment, the transformed BGP information comprises information such as Path Attributes, Origin or Originator, AS_Path, Next_hop, multi-exit-disc or "MED," Local Preference or LOCAL-PREF, Aggregate, Aggregator, Community, Extended Community, and Cluster list, as well as prefixes associated with the network attributes and other information. The transformed BGP information may be stored in type-length values ("TLVs") compatible with the IGP network on local domain 140. These TLVs and other aspects of the transformed BGP information are discussed in more detail below.

Edge router 2-N 136 then transmits IGP message 142 containing the transformed BGP information, along with any IGP information that requires transmission by edge router 2-N 136. This IGP information might include updates on the topology or link-state of the IGP network running on local domain 140, such as changes in the presence, availability, or connectivity of routers within local domain 140. Types of IGPs include OSPF and IS-IS. If local domain 140 runs an IS-IS network then IGP message 142 might include information specific to IS-IS as well as IS-IS header information. In another example, if local domain 140 runs an OSPF network then IGP message 142 might include information specific to OSPF as well as OSPF header information.

After edge router 136 transmits IGP message 142, IGP message 142 is received by interior router 126, which stores the BGP information in an IGP database corresponding to the IGP network running on local domain 140. Interior router 126 may also store in the IGP database any pertinent IGP information received in IGP message 142. In an embodiment, interior router 126 may then propagate this BGP information to other interior routers and edge routers via the IGP network running on local domain 140. To facilitate this propagation, each router in local domain 140 may have an IGP database capable of storing the BGP information, for example through the use of TLVs. In propagating the BGP information, interior router 126 may itself transmit an IGP message containing the transformed BGP information. As the routers in local domain 140 may not all be directly connected to one another, it may require several messages before all routers have received and stored the BGP information.

There are several ways in which the BGP information from BGP message 152 can be transformed for inclusion in IGP message 142 and then propagated throughout the IGP network running on local domain 140. In embodiments a configurable timer defined on a routing devices or routing devices, specifies a time at which the routing device(s) will randomly move a peer out of database exchange, i.e., the configurable timer triggers the routing device(s) to select a peer at random and mark it as a candidate for moving to no-exchange mode on verifying that paths still exist to all routing devices within the local domain. The routing device(s) also updates the transformed BGP information stored in the local IGP database and transmits that information to all neighbors. In addition, routing device peers could be clumped depending on proximity to routing paths defined as higher priority. The higher-priority routes may be either user-defined or default. For these higher-priority routes the routing device would be configured to maintain a minimum number of full-exchange peers that face towards or away from the direction of the higher-priority route.

In one example of transformation and propagation, the edge router could talk to a local virtual iBGP neighbor which would receive the BGP message 152 containing the BGP information (such as routing information for BGP network 150) just as if it was a real neighbor. The local virtual neighbor would then pack the set of BGP routes into a consolidated set of type length values ("TLVs") comprised of a data-structure similar to that used by BGP network 150 for transmission of routing updates via BGP message 152 (e.g., a BGP Update message), along with the local Router-ID, update-ID, message age, and a sequence number. These TLVs are then stored in the local domain 140 IGP database of edge router 136 and transmitted in IGP message 142 to interior router 126. These TLVs could also be transmitted in other IGP messages to other edge routers (132, 134) and interior routers (112, 114, 116, 122, 124, 126) in local domain 140. By consolidating the data in edge router 136, packing of identical prefixes sharing the same path can be done to reduce database consumption. Later, if the transformed BGP information needs to be revised either due to the addition of more prefixes or revised path information, then a new message of the same update-ID but better sequence number is created. For example, a second BGP message might arrive at edge router 136 with updates to the paths available on the BGP network. To clear out the prefixes associated with a given BGP path stored in the, a new revised entry of the same update-ID but empty path and prefix set and better sequence number would be generated and transmitted. Any entries no longer needed would not be refreshed and would expire by their age timing out.

Alternatively, the transformation of the BGP information from BGP message 152 could be done by directly leveraging the IGP as transport in order to generate an IGP message containing TLVs similar to those described above with respect to the virtual neighbor. An exemplary message may not require a message age or update-ID, but could include the maximum number of entries to be retained from any one BGP peer (n) and the expected pacing interval for messages (x), with edge router 136 pushing n such messages (e.g., Update messages) every x interval. Intervening devices, such as interior router 126, only retain the highest sequence number frame from a given edge router (identified by router-ID) and the n prior messages. In order for each remote edge of local domain 140 to know it needs to re-send its database, an IGP message could be transmitted on local domain 140 for a limited time period that is a multiple of x (e.g., 3x). Alternatively, routers on local domain 140 could transmit targeted update messages which request a specific Router-ID to update only its set of entries. These targeted update messages also could age out after a multiple of x (e.g., 3x).

Alternatively, in order to propagate BGP information within local domain 140, each edge router and interior router could export its internal in-memory data structure of the locally best path database (e.g., set of TLVs containing BGP information) as a single object identified by its router-ID and with a sequence number. Edge router 136 (and other routers in local domain 140) could then publish new versions of the routing table would as a new copy of the in-memory structure with a better sequence number.

As discussed above, in an embodiment the transformed BGP information is carried in TLVs. The IS-IS protocol, a type of IGP, allows use of arbitrary TLVs that could be used to carry the BGP information. Although the standard OSPF protocol does not allow arbitrary TLVs, the OSPF protocol could be modified to allow for use of such arbitrary TLVs, for example as discussed in the Internet Engineering Task Force Internet Draft "Using Operator-defined TLVs for Agile Service Deployment."

Although FIG. 1 shows the BGP message 152 being received, processed, and transmitted by edge router 2-N 136, this could occur at other edge routers within the local domain 140. Similarly, IGP message 142 could be received, processed, and transmitted by other interior routers 112, 114, 116, 122, 124 within local domain 140.

In a further embodiment, another of the edge routers in local domain 140, e.g., edge router 132, may ultimately receive a second IGP message containing the transformed BGP information. As discussed above, the BGP information may be contained, for example, in TLVs, and the second IGP message may be of an OSPF, IS-IS, or other format depending on the IGP being run on local domain 140. Edge router 132 would then extract the transformed BGP information from the second IGP message, extract or otherwise derive the BGP information from the transformed BGP information, and generate a second BGP message containing the BGP information. Similar to above, this extraction or derivation of the BGP information may involve use of a local virtual internal Border Gateway Protocol (iBGP) neighbor running on edge router 132. Edge router 132 would then transmit this second BGP message outside the local domain on a BGP network, such as BGP network 150 or another BGP network. In this way, local domain 140 may act as an IGP-centric transit domain within a larger BGP network or group of BGP networks. In embodiments, IGP network information could be transformed into BGP-compatible formats for transmission in BGP message. In some instances, routes internal to local domain 140 may be generated for external advertisement, in which case the BGP protocol attributes could be described and related to the similar ones within OSPF or ISIS for external transmission over BGP network 150.

In the embodiments described above with respect to FIG. 1, the edge routers could run BGP best-path determinations and transmit the results in the IGP database, e.g., using TLVs in OSPF or IS-IS, without the need for maintaining internal state information as might be required for a local domain running both IGP and BGP.

Figure 2:
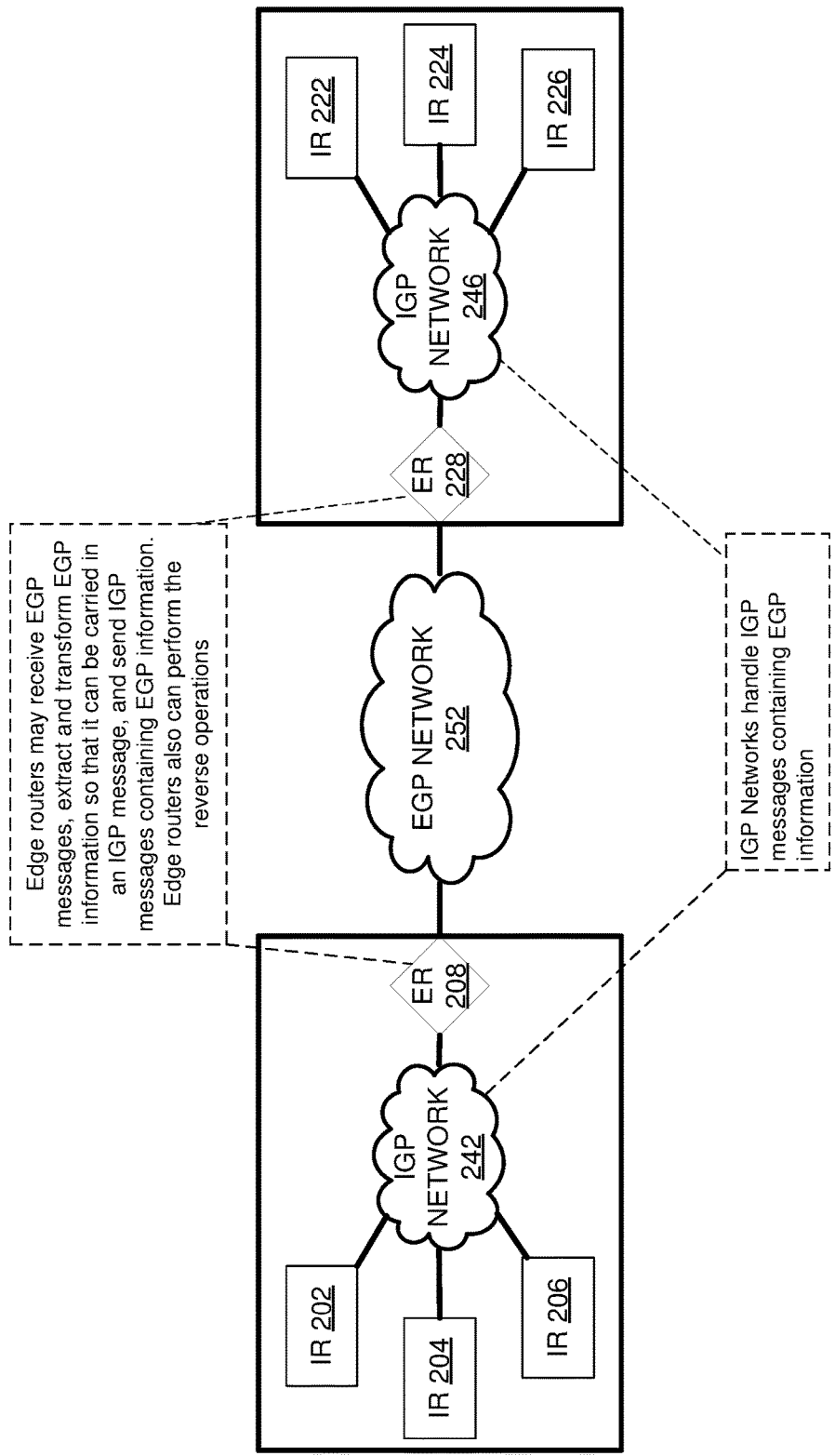
FIG. 2 is an example system diagram of separate domains running respective IGP networks that communicate routing path information for an EGP network to which each of the IGP networks is connected.

FIG. 2 is an example system diagram of separate domains running respective IGP networks 242 246 that communicate routing path information for an EGP network 252 to which each of the IGP networks is connected via edge routers 208 228. In one domain, interior routers 202 204 206 and edge router 208 run IGP network 242. In a second domain, interior routers 222 224 226 and edge router 228 run IGP network 246. Edge routers 208 228 also run EGP network 252. Though not shown, each IGP network 242 246 and its associated domain may include hundreds of interior routers and large numbers of edge routers. IGP networks 242 246 may run any of the OSPF protocol, the IS-IS protocols, or other known IGPs. EGP network may be a BGP or other known EGP.

Edge routers 208 228 may receive EGP messages transmitted on EGP network 252, extract EGP information from these EGP messages, transform that EGP information so that it can be carried in an IGP message, and then transmit IGP messages containing the EGP information. This occurs in a similar fashion as described above for BGP messages received at edge routers with respect to FIG. 1. As noted above, BGP networks are a type of EGP network. Edge routers 208 228 may also perform the reverse operations, receiving IGP messages, extracting EGP information, and then sending that EGP information as part of an EGP message.

In an embodiment, routing path information for EGP network 252 may be received in an EGP message at edge router 228. Edge router 228 may extract the EGP routing path information and transform it into a format for transmission over IGP network 246. Edge router 228 then transmits an IGP message containing the EGP routing path information over IGP network. That message is received by one or more routers on IGP network 246 and ultimately propagated to all routers running IGP network 246, which then store the EGP routing path information in local IGP databases. When routers in IGP network 246 make routing decisions, they may select a routing path based in part on the EGP path information.

Figure 3:
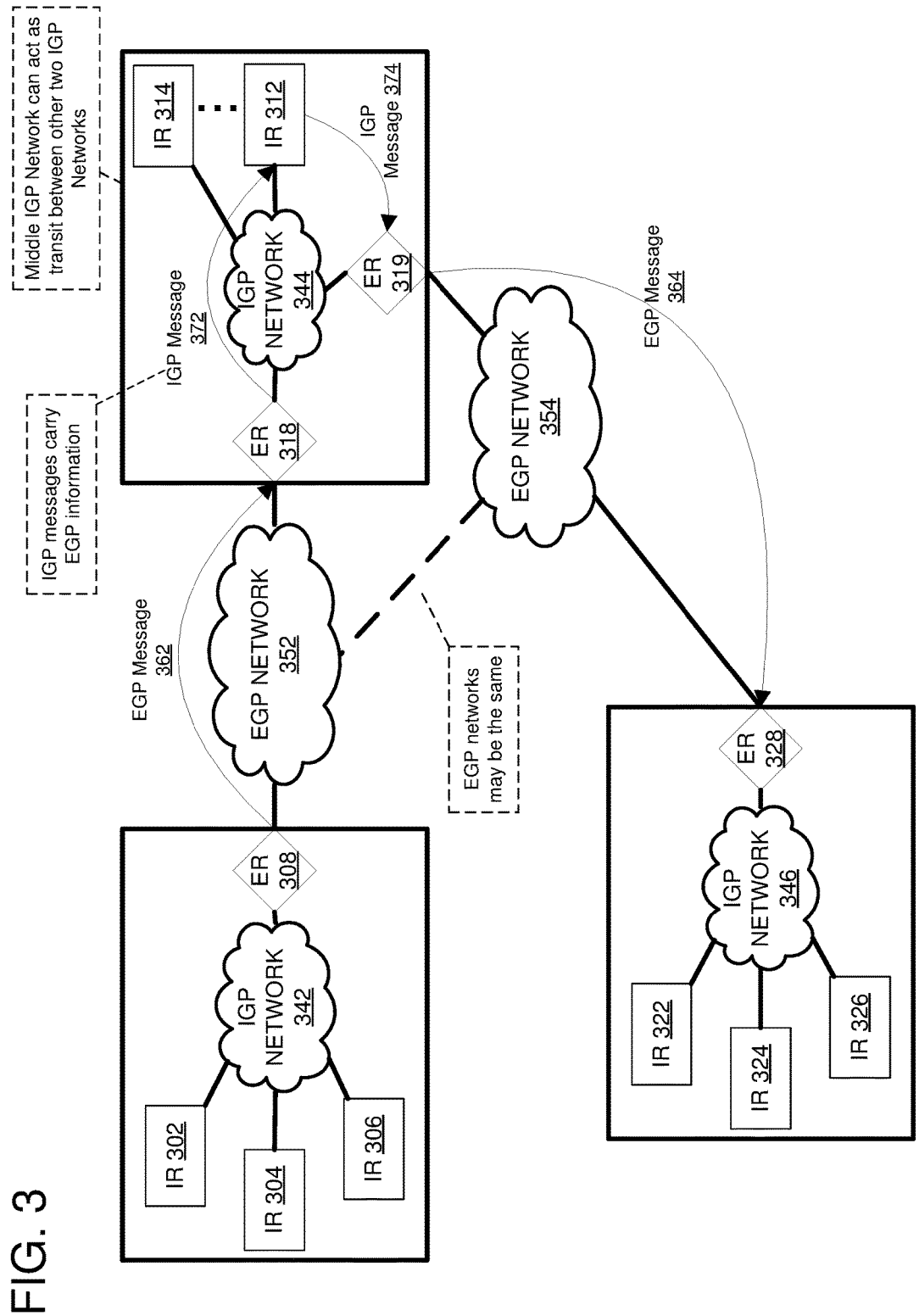
FIG. 3 is a system diagram illustrating an embodiment of a network environment in which one IGP network acts as a transit between two other IGP networks.

FIG. 3 is a system diagram illustrating an embodiment of a network environment in which one IGP network 344 acts as a transit between two other IGP networks 342 346. The different domains running IGP networks in FIG. 3 are similar to the domains running IGP networks 242 246 in FIG. 2. Each domain has several interior and edge routers running on an IGP network, with one or more edge routers also running on an EGP network. FIG. 3 illustrates an additional aspect by showing a third domain running IGP network 344. The IGP networks may be OSPF, IS-IS, or another IGP network. The EGP network or networks may be BGP or another EGP.

As shown in FIG. 3, edge router 308 may transmit an EGP message 362 over EGP network 352. EGP message 362 contains routing path information for EGP network 352 and is received at edge router 318 in a domain with routers running on IGP network 344. Similar to other embodiments described above, edge router 318 extracts processes the EGP information so that it may be included in an IGP message 372 transmitted on IGP network 344. The processing includes extracting the EGP information and transforming it so that it may be included in an IGP message sent over IGP network 344, similar to that described above with respect to FIG. 1 and transformation and propagation of BGP information in an IGP network.

IGP message 372 may be received at interior router 312, which stores the EGP information in its IGP database and then sends an IGP message 374 containing update information including the EGP information, which may be transmitted and stored in the form of TLVs on IGP network 344. IGP message 374, in turn, may be received by edge router 319. Among other things, edge router 319 may extract from IGP message 374 the EGP information for EGP network 352 and transmit over EGP network 354 EGP message 364 containing the EGP information for EGP network 352. For example, if IGP message 374 is an OSPF or IS-IS message in which the EGP information is stored in TLVs, then edge router 319 may be programmed to extract the EGP information from the corresponding TLVs and then generate EGP message 364 such that it includes the EGP information extracted from the TLVs. EGP message 364 may follow an outbound route policy and implementation that removes any indication that the BGP information was transmitted using IGP network 344. In embodiments, edge router 319 may modify the extracted EGP information before including it in the outbound EGP message, for example to reflect additional path updates determined by edge router 319. EGP network 352 and EGP network 354 may be different EGP networks or may be the same EGP network.

EGP message 364 then may be received at edge router 328, which as with edge router 318, extracts and processes the EGP information that came from with edge router 308 via EGP message 362. Edge router 328 then uses IGP network 346 to propagate the EGP information from edge router 308 to other routers in the domain associated with IGP network 346. The EGP information from edge router 308 may then be used in making routing decisions for paths originating within IGP network 346.

In this way, IGP network 344 and its routers may serve as a transit between different endpoints in an EGP network, in one example allowing EGP information from edge router 308 in IGP network 342 to reach edge router 328 in IGP network 346.

Figure 4:
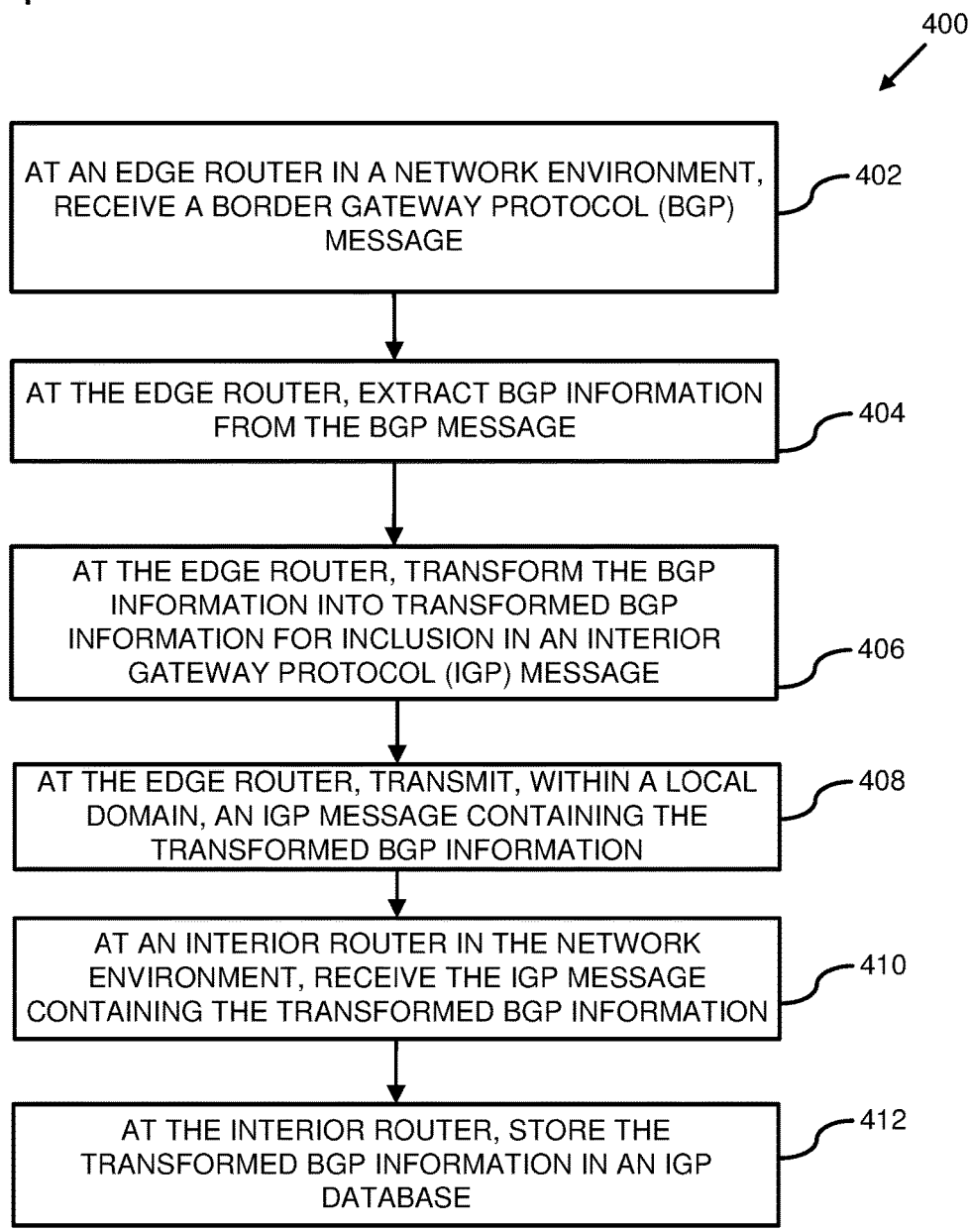
FIG. 4 is a flowchart of a method according to one embodiment for receiving and transmitting different types of messages containing BGP information.

FIG. 4 is a flowchart of a method according to one embodiment for receiving and transmitting different types of messages containing BGP information. In process block 402 an edge router in a network environment receives a border gateway protocol ("BGP") message. The BGP message contains BGP information such as routing path information for a BGP network on which the edge router is configured to communicate. In process block 404 the edge router extracts the BGP information from the BGP message. In process block 406, the edge router transforms the BGP information into transformed BGP information that may be included in an IGP message. In process block 408, the edge router transmits within a local domain an IGP message containing the transformed BGP information. Examples of the local domain include a multi-tier network, a data center, or other groupings of routing devices. In an embodiment, all routers in the local domain run a common routing protocol with a smaller number of the routers, e.g., edge routers, also running a secondary routing protocol. The common routing protocol may be an IGP such as the OSPF protocol or the IS-IS protocol. The secondary routing protocol may be an EGP such as BGP. In embodiments, the BGP information may be extracted, processed, transformed, and transmitted as described above. For example, the transformed BGP information may comprise TLVs containing the BGP information. In process block 410 an interior router in the network environment receives the IGP message containing the transformed BGP information. In process block 412 the transformed BGP information is stored in an IGP database at the interior router.

In embodiments, the IGP is a link-state protocol such as OSPF or IS-IS, and the BGP information is propagated throughout a group of routers running the IGP (e.g., local domain). In embodiments of the local domain, a not-so-stubby-area (NSSA) is set up between tiers of a multi-tier network in order to achieve a smaller topology state for devices in or connected to the multi-tier network. In embodiments, the database includes aspects of a "T2 Bouncer" database, as is known in the art. In embodiments, the IGP network provides a full iBGP-like mesh without the overhead of a full iBGP network transmitting iBGP messages—all routers in the IGP network receive BGP information (e.g., NLRI information) and store it in a link-state database ("LSDB"). For example, a link-state database of the IGP could serve as the iBGP peer for routers in the local domain. In embodiments, routers in the IGP network use the transformed BGP information to make routing decisions, e.g., by employing a BGP path selection process using the transformed BGP information. In embodiments, certain routes are marked as more important to hardware and these routes are given higher priority by providing network devices with this information including through IGP messages containing transformed BGP information.

Figure 5:
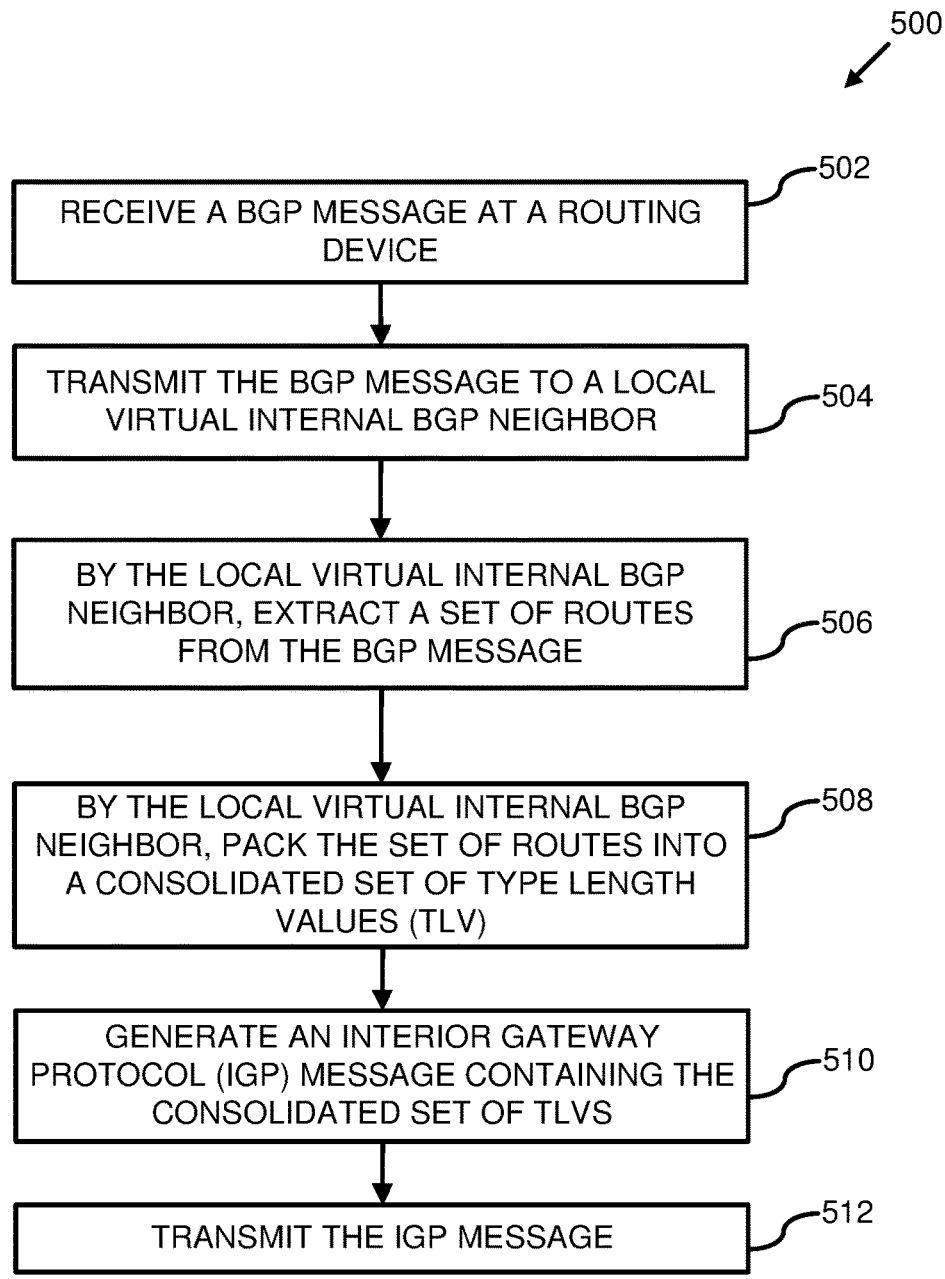
FIG. 5 is a flowchart of a method according to one embodiment for receiving a BGP message containing BGP information and transmitting an IGP message containing BGP information.

FIG. 5 is a flowchart of a method according to one embodiment for receiving a BGP message containing BGP information and transmitting an IGP message containing BGP information. In process block 502 a BGP message is received at a routing device. In process block 504 the BGP message is transmitted to a local virtual internal BGP (iBGP) neighbor on the routing device. In process block 506 a set of routes is extracted from the BGP message by the local virtual iBGP neighbor. In process block 508 the set of routes is packed into a consolidated set of type length values ("TLVs") by the local virtual iBGP neighbor. In process block 510 an IGP message containing the consolidated set of TLVs. In process block 512 the IGP message is transmitted. In embodiments the IGP message is a link-state protocol message such as an OSPF or IS-IS message transmitted on a local domain in which routers primarily run the link-state protocol. In further embodiments, the IGP message comprises a link-state advertisement ("LSA") that allows for the transport of arbitrary TLVs using the OSPF protocol.

Figure 6:
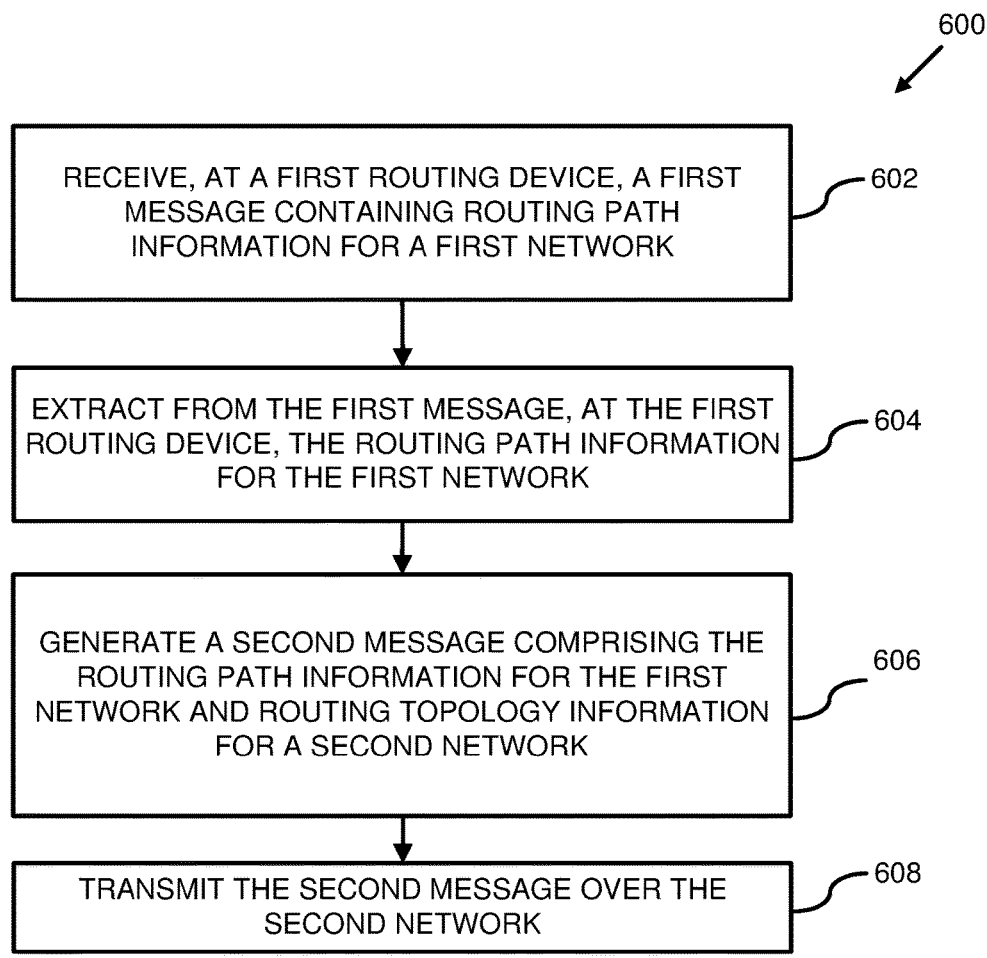
FIG. 6 is a flowchart of a method according to one embodiment for optimizing network communications.

FIG. 6 is a flowchart of a method according to one embodiment for optimizing network communications. In process block 602 a first message containing routing path information for a first network is received at a first routing device. The first network may be an EGP network such as a BGP network and the first message may be an EGP message such as a BGP message containing BGP routing path information. In process block 604 the routing path information for the first network is extracted at the first routing device. In process block 606 a second message comprising the routing path information for the first network and routing topology information for a second network is generated. The second network may be an IGP network running a link-state protocol such as OSPF or IS-IS and the second message may be an IGP message with TLVs that contain the routing path information for the first network. In embodiments the first network comprises a number of interior routing devices that are not all directly connected to one another.

In process block 608 the second message is transmitted over the second network. In embodiments, the first routing device may store in a first routing database the routing path information for the first network along with topology information for the second network. In further embodiments the second message may be received at a second routing device in the second network, the routing path information for the first network may be stored in a second routing database at the second routing device, and the second routing device calculating, at the second routing device may calculate a best routing path based at least in part on the routing path information for the first network and routing topology information for the second network. In embodiments, the first network may comprise a network of autonomous systems and the second network may comprise a network within an autonomous system. In embodiments, the routing path information for the first network may comprise network layer reachability information ("NLRI") and path update information.

Figure 7:
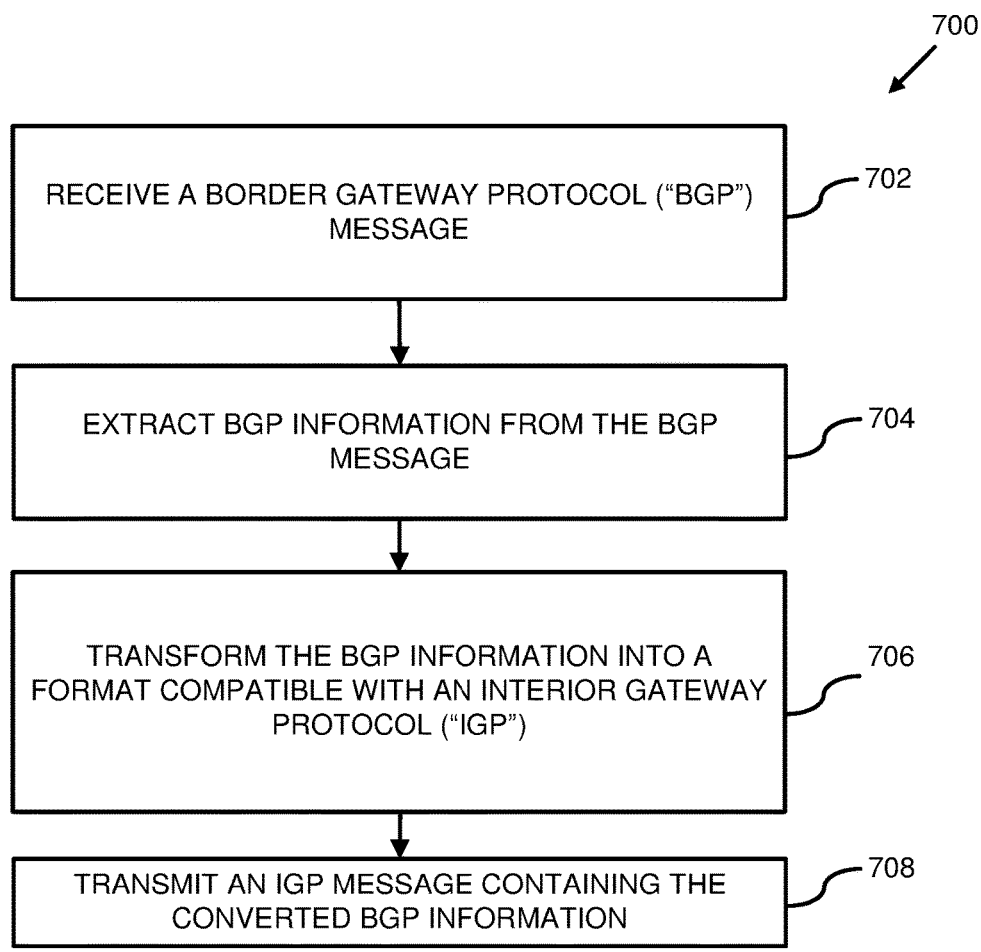
FIG. 7 is a flowchart of a method according to one embodiment for optimizing network communications.

FIG. 7 is a flowchart of a method according to one embodiment for optimizing network communications. In process block 702 a BGP message is received. In process block 704 BGP information is extracted from the BGP message. In process block 706, the BGP information is transformed into a format compatible with an IGP protocol. In embodiments the IGP protocol may be a link-state protocol such as OSPF or IS-IS and the BGP information may be transformed by storing it in TLVs compatible with link-state advertisements sent over the IGP protocol. In embodiments, the process may involve use of a local virtual iBGP neighbor, as described above. In process block 708 the IGP message containing the converted BGP information is transmitted. The steps of FIG. 7 may be carried out on an edge routing device in a network comprising edge routing devices running both an IGP and BGP protocol and interior routing devices running only the IGP protocol. In embodiments, the BGP information, such as NLRIs and/or best-path information, is stored in an IGP routing database along with IGP routing information, such as link-state information.

In embodiments, the methods illustrated in FIGS. 4-7 could be carried out in any of the networks shown in FIGS. 1-3.

Figure 8:
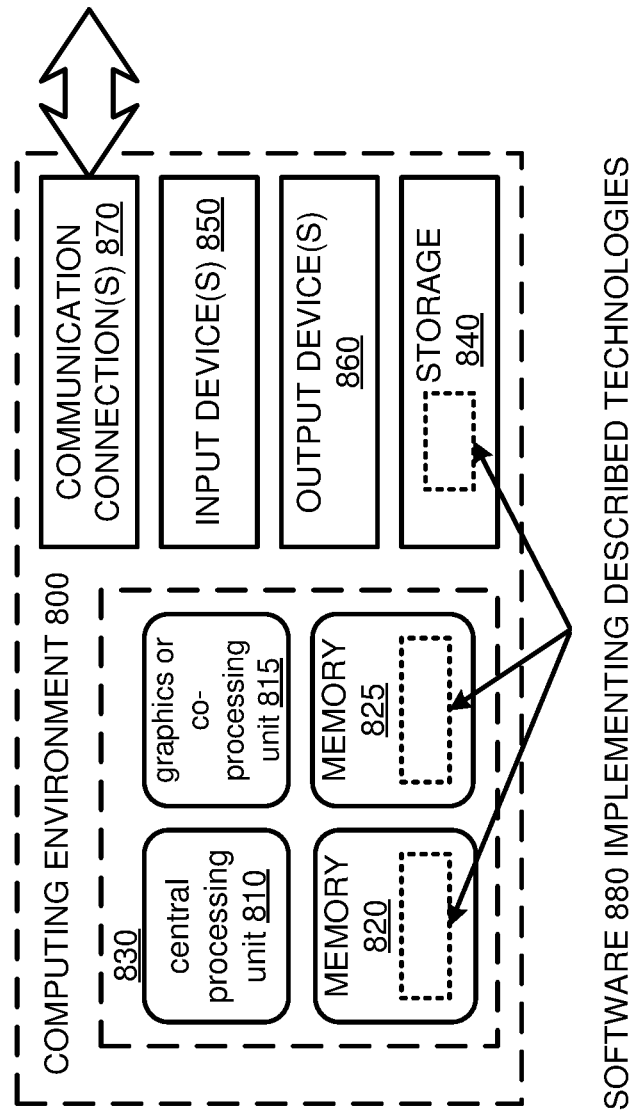
FIG. 8 depicts a generalized example of a suitable computing environment in which the described innovations may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.). In embodiments, computing environment 800 is a routing device specifically designed and built to serve as a "router." In other embodiments, computing environment 800 is a a general-purpose computing device programmed to act as a routing device.

With reference to FIG. 8, the computing environment 800 includes one or more processing units 810, 815 and memory 820, 825. In FIG. 8, this basic configuration 1030 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A network environment, comprising:
an edge router configured to:
receive a border gateway protocol ("BGP") message;
extract BGP information from the BGP message;
transform the BGP information into transformed BGP information for inclusion in an Interior Gateway Protocol ("IGP") message; and
transmit, within a local network domain, the IGP message containing the transformed BGP information; and
an interior router configured to:
receive the IGP message containing the transformed BGP information;
store the transformed BGP information in an IGP database; and
calculate a best routing path based at least in part on the transformed BGP information;
wherein the IGP is a link-state protocol.

2. The network environment of claim 1, wherein the IGP is an implementation of the open shortest path first (OSPF) routing protocol or the Intermediate System to Intermediate System ("IS-IS") routing protocol, and the transformed BGP information is embedded within a type length value ("TLV") element.

3. The network environment of claim 1, wherein the interior router is further configured to transmit a second IGP message containing the transformed BGP information, and wherein the interior router is not directly connected to all other interior routers in the network environment.

4. The network environment of claim 1, wherein the edge router is further configured to generate the IGP message containing the transformed BGP information based on communications with a local virtual internal BGP neighbor that supplies a set of BGP routes into a consolidated set of TLV elements.

5. The network environment of claim 1, wherein the edge router is one of a group of edge routers and the interior router is one of a group of interior routers, wherein the edge routers run both the BGP and the IGP, and wherein the interior routers run the IGP without running the BGP.

6. The network environment of claim 1, further comprising a second edge router configured to:
receive a second IGP message containing the transformed BGP information;
extract the transformed BGP information from the second IGP message;
derive the BGP information from the transformed BGP information;
generate a second BGP message containing the BGP information; and
transmit the second BGP message outside the local network domain.

7. A method, comprising:
receiving, at a first routing device, a first message containing routing path information for a first network;
extracting from the first message, at the first routing device, the routing path information for the first network;
generating a second message comprising:
the routing path information for the first network; and
routing topology information for a second network; and
transmitting the second message over the second network,
wherein the second message is received at a second routing device communicating over the second network and the routing path information for the first network and the routing topology information for the second network are used by the second routing device in calculating a best routing path.

8. The method of claim 7, further comprising storing, in a first routing database on the first routing device, the routing path information for the first network, wherein the first routing database also contains routing topology information for the second network.

9. The method of claim 7, wherein the first message is an exterior gateway protocol ("EGP") message and the second message is an interior gateway protocol ("IGP") message.

10. The method of claim 9, wherein the EGP message is a border gateway protocol ("BGP") message.

11. The method of claim 7, wherein the second routing device stores the routing path information for the first network in a second routing database.

12. The method of claim 11, wherein the second routing database is a link-state protocol routing database.

13. The method of claim 7, wherein the first network comprises a network of autonomous systems and the second network comprises a network within an autonomous system.

14. The method of claim 7, wherein the second message comprises a type length value ("TLV") element containing the routing path information for the first network.

15. The method of claim 7, wherein the routing path information for the first network comprises network layer reachability information ("NLRI") and path update information.

16. The method of claim 7, wherein the first network comprises a number of interior routing devices that are not all directly connected to one another.

17. A routing device comprising code that when executed causes the routing device to:
receive a border gateway protocol ("BGP") message;
extract BGP information from the BGP message;
transform the BGP information into a format compatible with an Interior Gateway Protocol ("IGP"); and
transmit an IGP message containing the transformed BGP information, wherein the IGP message is configured for receipt by a second routing device and use by the second routing device of the transformed BGP information in calculating a best routing path.

18. The routing device of claim 17, wherein the IGP message comprises a type-length value ("TLV") containing the BGP information.

19. The routing device of claim 17, further comprising code that when executed causes the routing device to store the BGP information in an IGP routing database along with IGP routing information.

20. The routing device of claim 17, wherein the BGP information comprises network layer reachability information ("NLRI") and best-path information.

* * * * *